Patented July 24, 1934

1,967,336

UNITED STATES PATENT OFFICE 1,967,336

LATEX ADHESIVE

Merwyn C. Teague, Jackson Heights, N. Y., assignor to The Naugatuck Chemical Company, Naugatuck, Conn., a corporation of Connecticut No Drawing. Application October 2, 1931, Serial No. 566,589

7 Claims. (Cl. 87—17)

This invention relates to the manufacture of latex adhesives and particularly to the manufacture of latex adhesives free from the objectionable odor of ammonia.

It has been the practice heretofore to use normal latex or heat concentrated latex, both of which contain ammonia as a preservative, in the manufacture of latex adhesives. These latex adhesives have none of the fire hazards of organic solvent rubber cements, such as the common naphtha cements, nor is there the loss of solvent necessarily accompanying the use of solvent cement. With the rapidly increasing demand for latex adhesives, especially in the shoe industry, the need has been strongly felt for such adhesives free from the undesirable ammoniacal odor incident to the usual ammonia preservation of the latex. In the copending application of A. W. Holmberg, Ser. No. 309,899, filed Oct. 2, 1928, a reduction of the objectionable ammoniacal odor was accomplished by creaming the latex as by means of creaming agents. In this way an ammonia content of less than .25% may be obtained. However, this reduction in ammonia content, from around 1% for normal latex, to .25% was considered insufficient for a great many uses and it was necessary to obtain a truly non-ammoniated latex cement.

This invention relates to a process for obtaining a non-ammoniated latex cement, and more particularly to a chemical process for the preparation of a non-ammoniated latex cement of neutral character, and to the product produced thereby.

In producing a non-ammoniacal latex, I add to commercial ammonia preserved latex a stabilizing agent, such as Nekal, a well known reaction product which may be obtained by condensing aromatic hydrocarbons with aliphatic alcohols in the presence of sulphuric acid. The latex may be normal, that is preserved with approximately 1% of ammonia as in the usual commercial practice or concentrated as by heat concentration, centrifuging, or by the use of creaming agents in a manner well known in the art, which forms of latex still retain ammonia. To the latex stabilized with Nekal, I add formaldehyde solution to completely react with the ammonium hydroxide present to form hexamethylenetetramine being careful not to provide an excess of formaldehyde. In practice I prefer to add a small amount of soap with the Nekal to assist in stabilizing the latex although this is not necessary for the successful carrying out of the process. As differentiated from the creaming process described above, this method is clearly a chemical method of producing non-ammoniated latex.

Without intention to limit the invention thereby, but merely to illustrate one process of preparing ammonia-free latex cements, the following example is included.

To 300 parts of normal latex containing approximately 33.3% rubber and preserved with 1% ammonia are added 2 parts of Nekal dissolved in an equal weight of water. 1 part of sodium oleate is then added in the form of a 10% aqueous solution. There is then added a sufficient amount of 37% aqueous solution, of formaldehyde to completely react with the ammonium hydroxide present, but without providing an excess of formaldehyde. A small amount of some pleasant odor or perfume may be added if desired.

This latex cement may be compounded further, as desired, for example by the addition of emulsified oil, water soluble gums, inert fillers, and the like as is common practice in the shoe industry, but the special methods of compounding for various uses and operations form no part of the present invention.

There is thus provided a substantially neutral non-ammoniated latex cement, free from objectionable ammoniacal or other odors, exceedingly stable both to standing and compounding, and with no fixed alkali present.

When a latex cement containing an appreciable amount of fixed alkali is used in connection with cotton fabrics, as in the manufacture of tennis shoes, for example, an excessive shrinking of the fabric takes place. If, however, an appreciable amount of fixed alkali is not objectionable, a modification of the above method of producing a non-ammoniated latex may be resorted to, wherein a fixed alkali such as sodium or potassium hydroxide is added to the ammonia preserved latex instead of Nekal, as a stabilizer, and the formaldehyde added to chemically react with the ammonia to form hexamethylenetetramine as above. In this case alkaline latex cement is produced but without the objectionable ammoniacal odor. In the preparation of non-ammonia latex cement by this method, it is desirable, but not necessary, to add an auxiliary preservative such as sodium perborate preferably after the formaldehyde titration. It should be kept in mind that a latex cement prepared by this modified process may not be as stable, especially toward compounding, as a latex cement prepared with Nekal and formaledhyde.

While specific examples of the invention have been disclosed, it is obvious that it may be otherwise practiced and embodied and it is not desired to limit it otherwise than as set forth in the appended claims.

Having thus described my invention, what I claim and desire to protect by Letters Patent is:

1. An adhesive composition comprising neutral latex containing hexamethylenetetramine from the reaction of formaldehyde and ammonia in the latex, and a stabilizer.

2. A substantially neutral adhesive composition comprising latex containing hexamethylenetetramine from the reaction of formaldehyde and ammonia in the latex, and Nekal.

3. A substantially neutral adhesive composition comprising latex containing hexamethylenetetramine from the reaction of formaldehyde and ammonia in the latex, Nekal, and soap.

4. An adhesive composition comprising latex containing free fixed alkali, and hexamethylenetetramine from the reaction of formaldehyde and ammonia in the latex.

5. An adhesive composition comprising latex containing free fixed alkali, sodium perborate, and hexamethylenetetramine from the reaction of formaldehyde and ammonia in the latex.

6. An adhesive composition comprising non-acid latex free from ammonia or formaldehyde, and containing hexamethylenetetramine from the reaction of formaldehyde and ammonia in the latex, and a stabilizer from the group consisting of Nekal and sodium hydroxide.

7. An adhesive composition comprising latex free from ammonia or formaldehyde, and containing hexamethylenetetramine from the reaction of formaldehyde and ammonia in the latex, and sodium hydroxide.

MERWYN C. TEAGUE.